Figure 1:
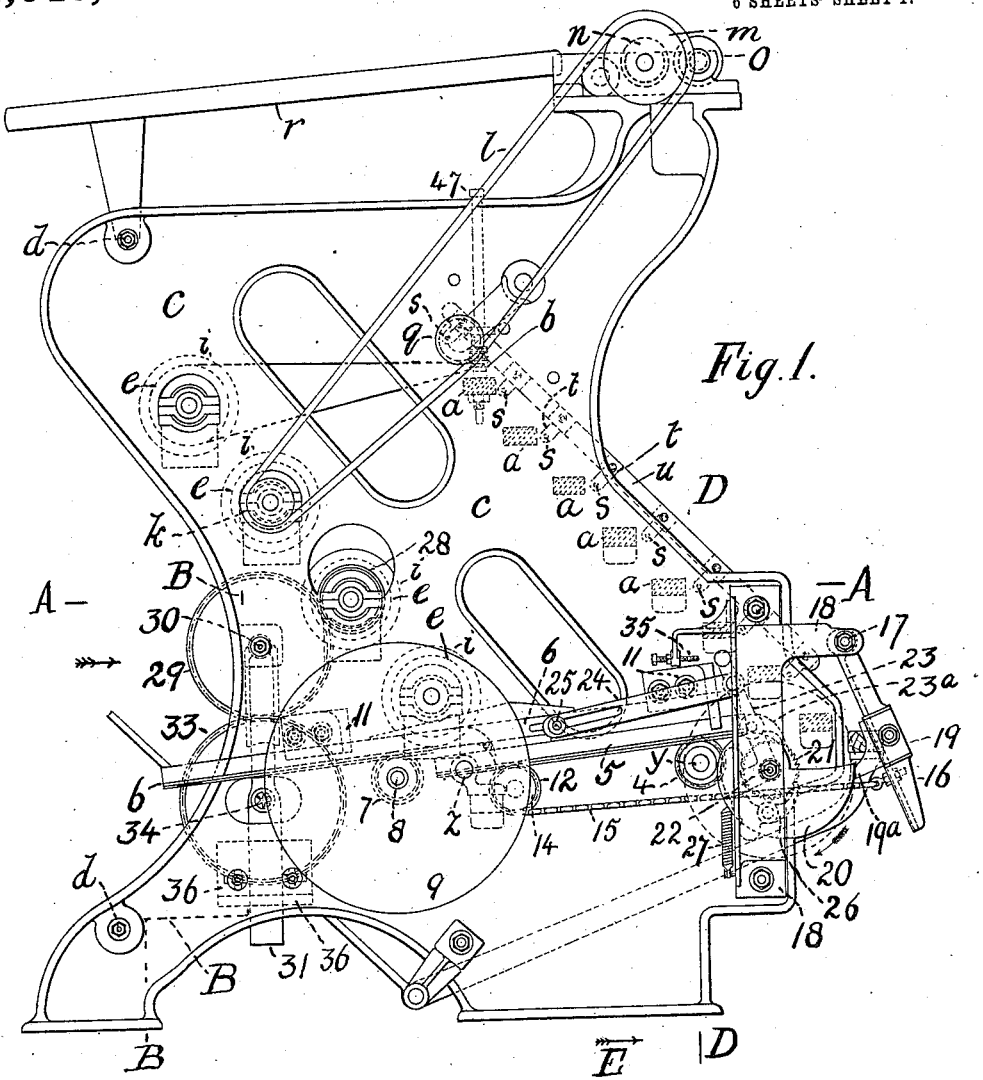

A. SEELEY & H. HOLT.
MACHINERY FOR WINDING YARNS OR THREADS ONTO BOBBINS OR THE LIKE.
APPLICATION FILED AUG. 17, 1911.

1,046,226.

Patented Dec. 3, 1912.

6 SHEETS—SHEET 1.

Witnesses:
Inventors:

A. SEELEY & H. HOLT.
MACHINERY FOR WINDING YARNS OR THREADS ONTO BOBBINS OR THE LIKE.
APPLICATION FILED AUG. 17, 1911.
1,046,226.
Patented Dec. 3, 1912.
6 SHEETS—SHEET 3.
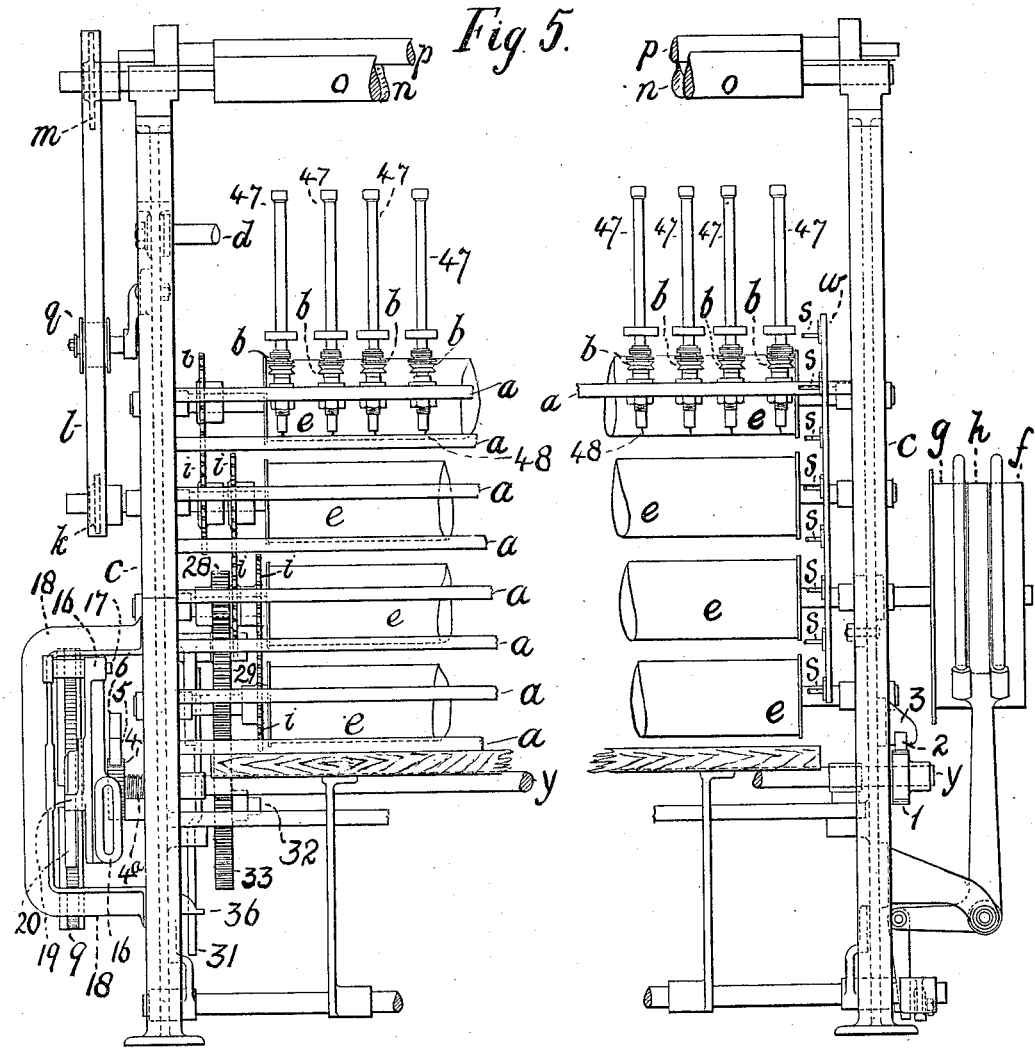
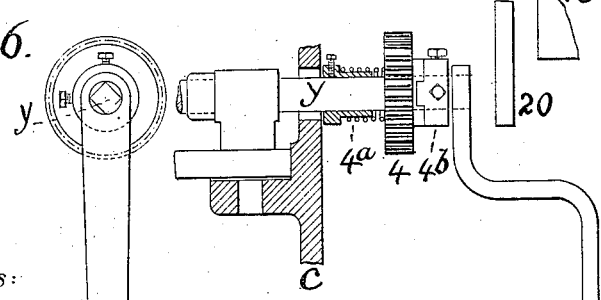

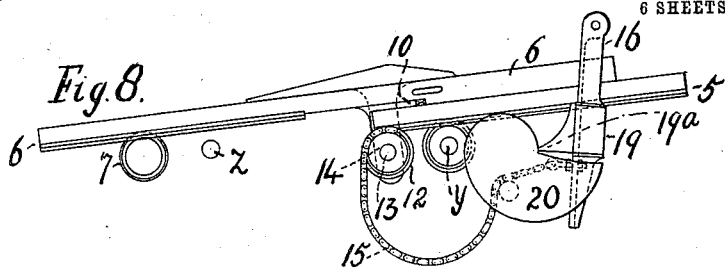
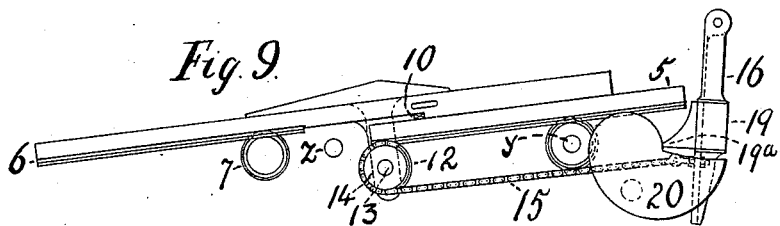
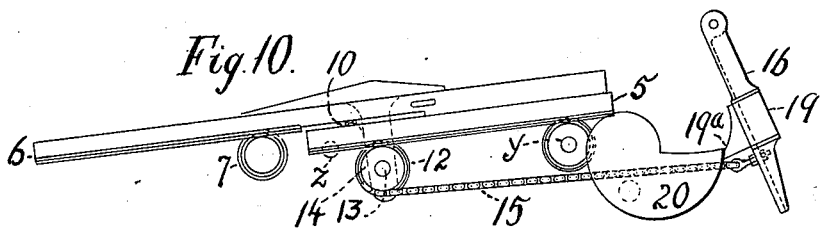
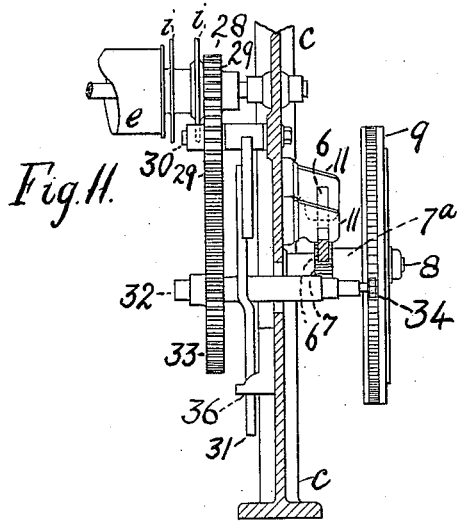
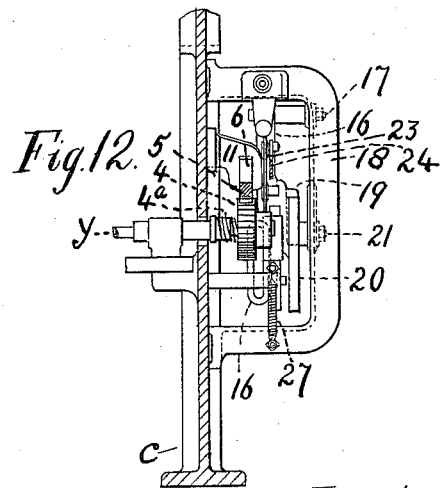

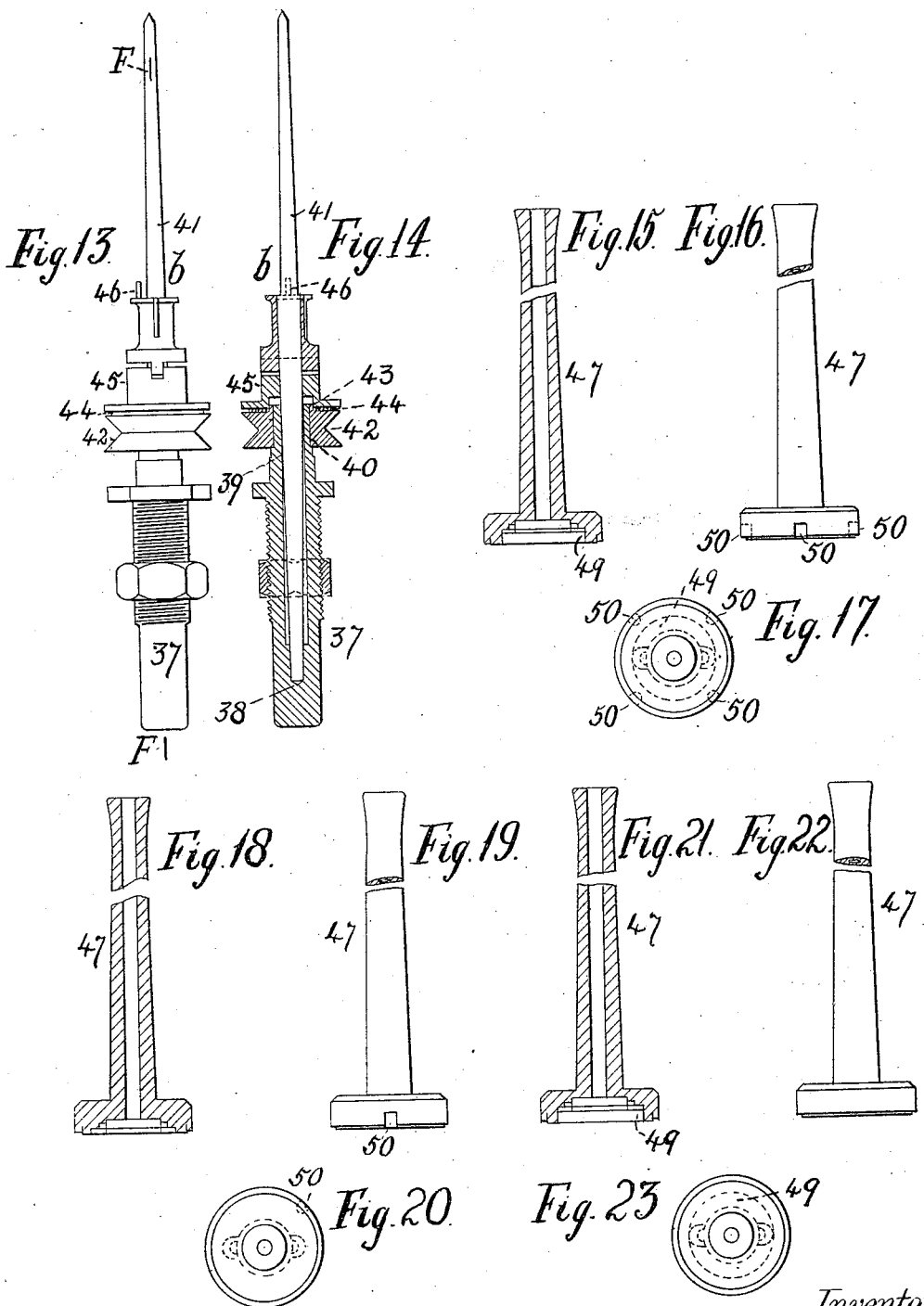

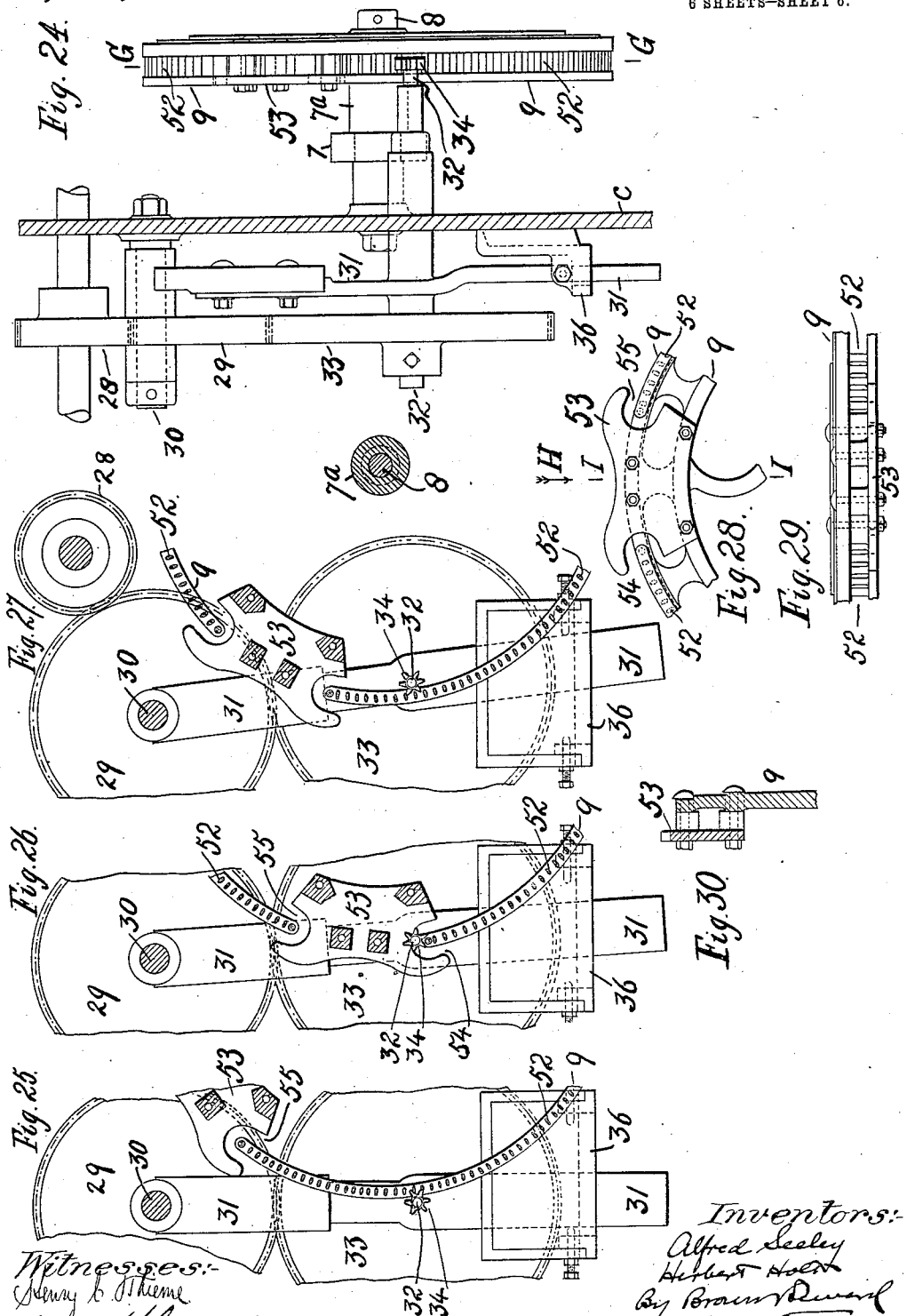

UNITED STATES PATENT OFFICE.

ALFRED SEELEY AND HERBERT HOLT, OF ROCHDALE, ENGLAND.

MACHINERY FOR WINDING YARNS OR THREADS ONTO BOBBINS OR THE LIKE.

1,046,226.  Specification of Letters Patent.  Patented Dec. 3, 1912.

Application filed August 17, 1911. Serial No. 644,496.

*To all whom it may concern:*

Be it known that we, ALFRED SEELEY, machine maker, a subject of the King of the United Kingdom of Great Britain, and resident of 54 Syke road, Rochdale, in the county of Lancaster, England, and HERBERT HOLT, machine maker, a subject of the King of the United Kingdom of Great Britain and Ireland, and resident of Shaw Hill, Cronkeyshaw, Rochdale, in the county of Lancaster, England, have invented new and useful Improvements in Machinery for Winding Yarns or Threads Onto Bobbins or the Like, of which the following is a specification.

This invention of improvements in machinery for winding yarns or threads on to bobbins or the like consists in improvements intended specially for and making it much more easy and convenient than it has hitherto been for yarns or threads, especially yarns or threads which have been already wound two or more together or into the form of warps or like assemblages or other yarns or threads to be wound singly or two or more together on to bobbins or the like into forms cylindrical or nearly so at one end and tapering at the other so that they may be unwound by being pulled off the ends of such bobbins or the like.

Although specially intended for facilitating the winding into such forms as aforesaid of yarns or threads such as those hereinbefore mentioned, the improvements constituting this invention are also applicable for winding yarns or threads of any other kind into such forms as aforesaid and may also when desirable be put out of action so that yarns or threads may be wound into cylindrical or approximately cylindrical forms.

Briefly stated, this invention comprises principally the provision in winding machines of spindles in suitable number and of such construction as to allow the bobbins or the like to "slip" or revolve more slowly than the spindles and in particular spindles such as are described in the specification of the Letters Patent granted to the above named Alfred Seeley and Herbert Holt, Number 996,530, dated June 27th 1911 and driven by suitable means, drawing-off rollers to deliver yarns or threads to be wound upon the spindles, thread-guiding means such as guide-rails for guiding the yarns or threads to the spindles and means further to be set forth in this description and the claims following for varying the extent of movement imparted to the thread-guiding means.

Figure 2:
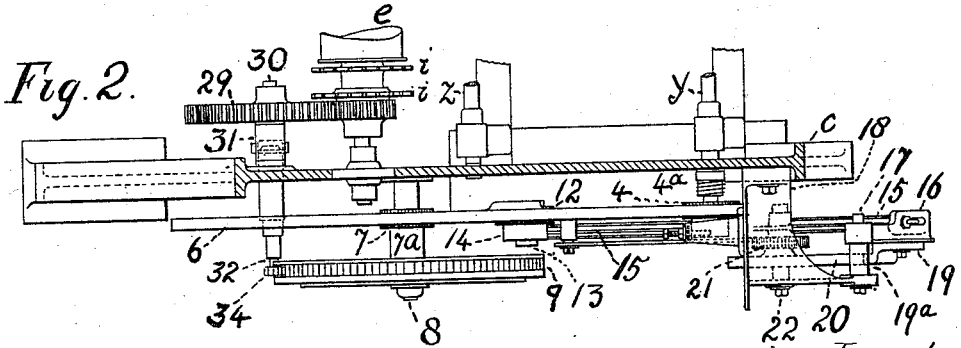
Figure 3:
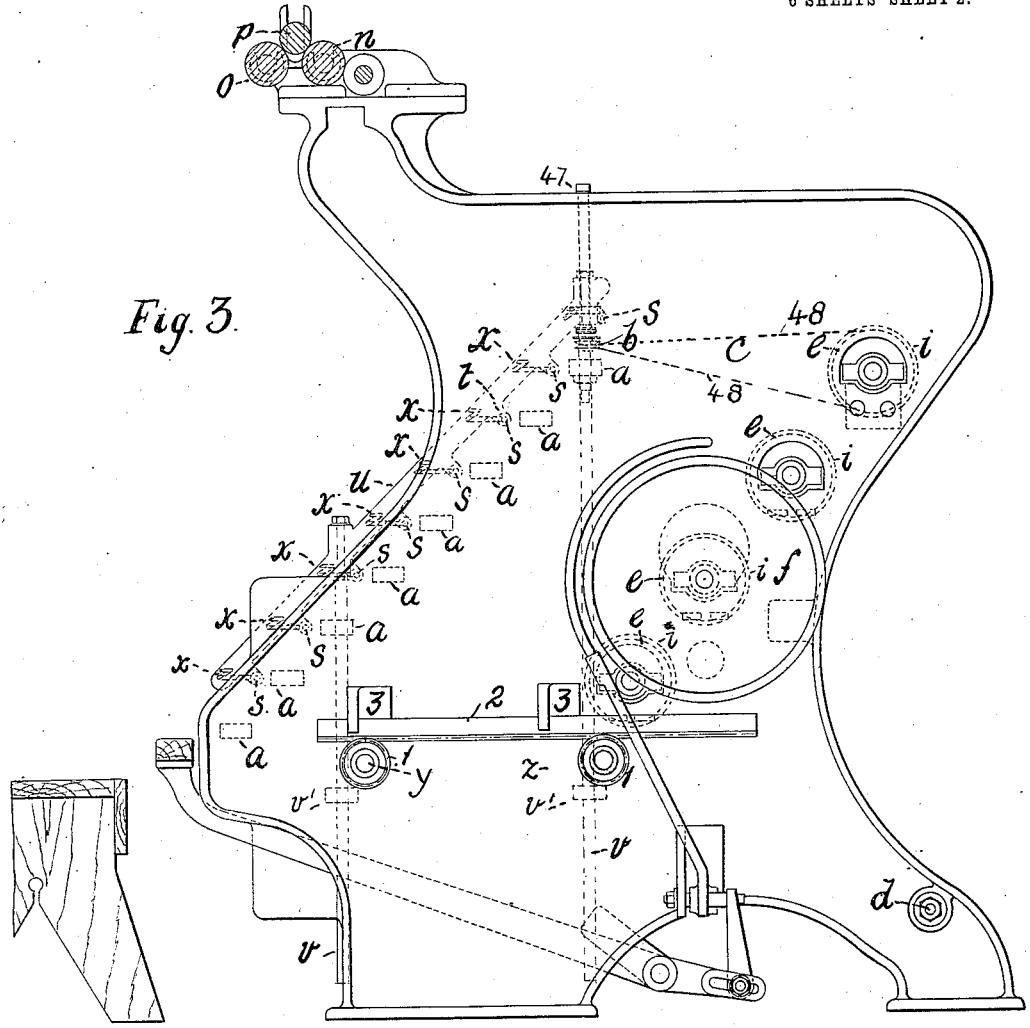
Figure 4:
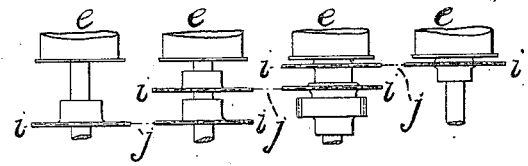

In the accompanying drawings, Figure 1 is an end elevation of one end of a winding machine constructed according to this invention. Fig. 2 is a horizontal section taken on the plane indicated by the line A A of Fig. 1. Fig. 3 is mainly a partial end elevation of the other end of the machine but is in part a vertical section through rollers used therein. Fig. 4 is a plan showing the chains and sprocket-wheels connecting the tin-rollers. Fig. 5 is a partial front elevation of the machine. Fig. 6 is an end view and Fig. 7 is a rear view partly in vertical section of means for moving the guide-rods independently of the mechanism which moves them in the ordinary working of the machine. Figs. 8, 9 and 10 are side elevations of parts shown in Fig. 1 represented detached and in different relative positions. Fig. 11 is a vertical section taken on the plane indicated by the line B B of Fig. 1 and seen in the direction indicated by the arrow C. Fig. 12 is a vertical section taken on the plane indicated by the line D D of Fig. 1 and seen in the direction indicated by the arrow E. Fig. 13 is a side elevation of one spindle to illustrate the kind of spindles preferably employed in the machine and Fig. 14 is a vertical section taken on the plane indicated by the line F F of Fig. 13. Fig. 15 is a side elevation, Fig. 16 is a vertical section and Fig. 17 is a plan showing one form of bobbin which may be used in a machine constructed according to this invention. Fig. 18 is a side elevation, Fig. 19 is a vertical section and Fig. 20 is a plan showing a second form of bobbin which may be used in a machine constructed according to this invention. Fig. 21 is a side elevation, Fig. 22 is a vertical section and Fig. 23 is a plan showing a third form of bobbin which may be used in a machine constructed according to this invention. Fig. 24 is a rear elevation partly in vertical section, showing a mangle-wheel and a pinion and some parts used in connection with such mangle-wheel. Figs. 25, 26 and 27 are vertical sections taken on the plane indicated by the line G G of Fig. 24, showing the mangle wheel and pinion and some other parts used therewith in different positions of action. Fig. 28 is a side elevation of part of the mangle-wheel, showing the aspect presented at the left hand side of Fig. 24. Fig. 29 is a view of the said part of the mangle-wheel seen in the direction indicated by the arrow H of Fig. 28. Fig. 30 is a section through the said part of the mangle wheel taken in the plane indicated by the line I I of Fig. 28. Figs. 24, 25, 26, 27, 28, 29 and 30 are drawn upon a larger scale than Figs. 1, 2, 3, 4, 5, 6, 7, 8, 9, 10, 11 and 12.

In the drawings, the improvements in mechanism provided according to this invention are illustrated as applied in a machine which in its general construction and mode of operation closely resembles that described in the specification of the Letters Patent granted to Herbert Leander Pratt and Charles Thomas Upton, Number 573,288, dated December 15th 1896.

$a$ $a$ are spindle-rails, eight being shown, supporting any requisite number of spindles $b$ shown as spindles of the kind described in the specification of the aforesaid Letters Patent, Number 996,530. The spindle-rails $a$ are secured at their ends to end-frames $c$ which with rods $d$ to connect them constitute the framework by which the other parts of the machine are carried. The end-frames $c$ which are provided with holes in appropriate positions are furnished with bearing-brackets with caps in which are mounted the shafts of tin-rollers, four being shown, which are made to impart motion to the pulleys of the spindles $b$ by means of bands passed around the pulleys of the spindles $b$ and one or other of the tin-rollers $e$. The shaft of one of the tin-rollers $e$ is provided with a fast pulley $f$ so that it may be driven and a loose pulley $g$ and an intermediate pulley $h$ by means of which the machine may be driven at a slow speed and motion is transmitted from that shaft to the shafts of the other tin-rollers $e$ by means of sprocket-wheels $i$ and chains $j$ mounted upon the tin-roller-shafts.

The shaft of one of the tin-rollers $e$ is furnished with a sprocket-wheel $k$ fast upon it around which is passed a chain $l$ passing around a sprocket-wheel $m$ mounted fast upon the axle projecting at one end of one of a group of three delivery-rollers $n$ $o$ $p$ mounted to revolve in bearings provided at the upper parts of the end-frames $c$ and a tightening pulley $q$ mounted upon a pivot carried by an arm pivoted to the one end-frame $c$ is provided to bear against and so to keep as tight as need be the chain $l$. The lower two delivery-rollers $n$ $o$ are supported by the bearings in which they are respectively mounted and the third, $p$, is supported by the other two while being guided in its movement by the bearings in which it is mounted. A frame or cover $r$ of glass panels mounted in a suitable frame is provided to extend over all the spindles $b$ to protect the yarn or thread wound on to the spindles $b$ from any objectionable matter falling from above it. For each rank of spindles $b$ mounted in the spindle-rails $a$ there is provided a guide-rod $s$. The guide-rods $s$ are shown as made to extend lengthwise of the machine through holes in downwardly inclined arms $t$ formed upon inclined bars $u$ furnished with sockets to receive the upper ends of lifting devices shown as consisting in poker-bars or lifter-pillars $v$ to which they are secured as by nuts. The guide-rods $s$ at their ends carry brackets in which they are secured by set-screws and which are secured by bolts to inclined bars $w$ serving to prevent the guide-rods $s$ from turning in the bars $u$ $v$. The guide-rods $s$ are provided with curls or eyes $x$. It is convenient that the curls or eyes $x$ be inserted in collars secured by set-screws to the guide-rods $s$ and placed together in pairs in order that yarns or threads may be led in divergent lines from adjacent curls or eyes $x$ to adjacent spindles $b$ as is convenient.

As thus far described in detail the mechanism is very similar to that described in the specification of the aforesaid Letters Patent Number 573,288 and the present invention consists in great part in the mechanism next to be described for imparting the movement to the guide-rods $s$ though there is much possibility of variation in the manner in which the poker-bars or lifter pillars $v$ or any other devices which may be used as equivalents therefor are guided and made to receive motion from the parts with which this invention is more particularly concerned.

The poker-bars or lifter-pillars $v$ are shown as made to pass through holes formed in two of the spindle-rails $s$ so as to be guided thereby and are shown as guided at their lower ends by fixed rails $v'$ vertically below the said two spindle-rails $s$ and formed with racks in engagement with pinions each mounted on one or other of two shafts $y$ $z$ mounted to be turned in bearings formed in the end-frames $c$. Each shaft $y$ $z$ is shown as having a toothed wheel 1 fast upon it and a rack 2 in gear with the two toothed wheels 1 shown mounted to be slid in guide-brackets 3 upon the one end-frame $c$ so that the two shafts $y$ $z$ shall always turn alike.

As best shown in Fig. 7, a pinion 4 upon the shaft $y$ and provided with a notch is normally pressed by a spring $4^a$ into engagement with a collar $4^b$ having a projection and fast upon the shaft $y$ which is provided with a handle $y'$ usually removed when not in actual use. Into the pinion 4 engages a rack 5 shown as mounted to slide against the lower surface of a bar shown as formed with a rack 6 in gear with a pinion 7 fast upon a sleeve 7ᵃ mounted on a fixed stud 8. A mangle-wheel 9 is fastened on the sleeve 7ᵃ. A projection 10 upon the rack 5 is provided to limit along with a shoulder upon the rack 6 the movement of the rack 5 in one direction relatively to the rack 6. The rack 6 is shown as guided and kept in gear with the pinion 7 and also guided laterally by means of projecting arms 11 upon brackets secured to the one end-frame c one of which also serves to guide the rack 5 and to keep it in gear with the pinion 4. The rack 5 is also made to rest upon and gear with a pinion 12 which is mounted to be turned upon a stud 13 carried by the rack 6 and is fast with a chain-barrel 14 to which one end of a chain 15 is connected. The chain 15 is connected at its other end to a lever 16 mounted to swing upon a stud 17 shown as carried by a frame 18 bolted at its upper and lower parts to the one end-frame c. The lever 16 is shown as formed with a slot so that the stud connecting the chain 15 to it and adapted to be secured in position by a nut may be adjusted in position. The lever 16 is also shown as provided with a block 19 adjustable upon it and adapted to be secured in position by means of a bolt passed through a slot in the lever 16 and provided with a nut and the block 19 is shown as formed with a projecting arm or nose 19ᵃ to bear against the edge of a cam 20 shown as being more or less of spiral form and, with a ratchet-wheel 21, fast to it, mounted loose upon a stud 22 secured in the frame 18. The projecting arm or nose 19ᵃ is made to extend laterally from the lever 16 so that the lever 16 may pass by one side of the cam 20 while the projecting arm or nose 19ᵃ bears against the edge of the parts of smaller radius. The stud 22 forms a pivot for an arm 23 which is weighted and carries a pawl 23ᵃ to engage with the ratchet-wheel 21 and is shown as connected by a slotted link 24 shown as allowing lost motion to a stud 25 adjustable and fixed in position in a slot formed in the rack 6. A stud fixed in the end-frame c carries a weighted pawl 26 to which is connected one end of a spring 27 connected at its other end to a hook secured in the frame 18, the pawl 26 serving to prevent the ratchet-wheel 21 from being turned in the direction opposite to that in which it is turned by the pawl 23ᵃ carried by the arm 23 and also to prevent such ratchet-wheel 21 from being turned in advance of the action of the pawl 23ᵃ by the pressure exerted against the cam 20 by the lever 16. A stop-screw 35 adjustable in a fixed bracket is provided to limit the movement of the arm 23 in one direction. On the shaft of one of the tin-rollers e a toothed wheel 28 is mounted which gears into a toothed wheel 29 mounted loose upon a stud 30 which is secured in the one end-frame c and forms the pivot of a lever 31 shown as formed in two parts bolted together so that its length may be adjusted. The lever 31 is provided with a bearing in which a short shaft 32 is fitted to be revolved. The shaft 32 is provided with a toothed wheel 33 fast upon it and in gear with the toothed wheel 29 and with a toothed pinion 34 fast upon it and in gear with the mangle-wheel 9.

As is more clearly shown by Figs. 24, 25, 26, 27, 28, 29, and 30, the mangle-wheel 9, as is usual with such things, is provided with a series of teeth 52 extending around the greater part but not all of its circumference. In the gap between the ends of the series of teeth 52, is provided a guide 53 shown as secured in position in the mangle-wheel 9 by means of bolts, collars and nuts and formed at opposite ends with hollows 54, 55, to be entered by and to guide the shaft 32 so that the pinion 34, working along the outer or inner side of the series of teeth 52 of the mangle-wheel 9, will pass from time to time first into one hollow 54 and then into the other hollow 55 of the guide 53, so as to be held by the guide 53 in gear with the tooth at the end of the series while moving around such tooth from the outer to the inner side of the mangle wheel 9 or from the inner to the outer side thereof as the case may be.

In order to limit the movement of the lever 31 about the stud 30 and to prevent the pinion 34 from passing out of gear with the mangle-wheel 9 in its movement in either direction a bracket 36 secured by bolts to the one end-frame c is provided with two fingers extending so that the lever 31 is between them.

Each of the spindles b one of which is shown separately in Figs. 13 and 14 comprises a bolster 37 with a foot-step 38, an inner bearing 39 and an outer bearing 40, a carrying part 41, in the form of a spindle-blade arranged to revolve within the bolster 37, a driving part shown in the form of a pulley 42 and revolubly supported on the outer bearing 40 and shown as provided with a central projection 43, a frictional pad 44 carried on the driving part 42 and around the central projection 43 and a friction-transmitting device 45 in driving connection with the said carrying part 41 and movable in the direction of the length thereof and bearing on the frictional pad 44 and shown as provided with a central recess to receive the central projection 43. The carrying part 41 of the spindle b is shown as provided with a peg 46 to enter a corresponding recess in each bobbin 47 to be applied to the spindle so that the bobbin 47 in use is in rigid connection with such carrying part 41 so as always to move therewith through the friction of the pad 44 against the driving part 42 and the friction-transmitting device 45 which remains approximately constant being unaffected by the weight of the carrying part 41 and the bobbin 47 and yarn or thread carried by it. The bobbin 47 and carrying part 41 are thus enabled easily to be held back by the yarn or thread so as to revolve at a speed corresponding to the rate at which yarns or threads are delivered by the rollers $n$ $o$ $p$ although the driving parts 42 are revolved at a speed higher than the speed requisite for the carrying parts 41 when yarns or threads are being wound upon the parts of the bobbins 47 which are of least diameter.

In the ordinary working of the machine motion being imparted by the fast pulley $f$ to the shaft of the tin-roller $e$ which carries the pulleys $f$ $g$ $h$, the tin-rollers $e$ being made to revolve will transmit, by means of bands 48, motion to the spindles $b$ while the shaft of the one tin-roller $e$ will transmit motion by means of the sprocket-wheel $k$, chain $l$ and sprocket-wheel $m$ to the delivery-roller $n$ and thereby to the rollers $o$ $p$ so that yarns or threads to be wound being delivered in any appropriate way to the delivery-rollers $n$ $o$ $p$ from any body or form on or into which they may have been wound already will all be delivered by such rollers $n$ $o$ $p$ at a similar rate to the spindles $b$. The spindles $b$ are driven so as to tend always to wind yarns or threads at a speed greater than that at which they are delivered by means of the delivery-rollers $n$ $o$ $p$ and consequently the bobbins 47 or the like on the spindles $b$ which receive the yarns or threads revolve a little more slowly than the driving parts 42 of the spindles $b$ and the more so as the quantity of yarns or threads wound upon each of the bobbins or the like increases in diameter. As the spindles $b$ revolve, motion is also transmitted from the shaft of the one tin-roller $e$ by means of the toothed wheel 28, toothed wheels 29 and 33, shaft 32 to the pinion 34 which is made to revolve and thus to act upon the teeth of the mangle-wheel 9. If the pinion 34 be in gear with the outer side of the series of teeth 52 of the mangle-wheel 9, as shown in Figs. 1, 2, 11, 24 and 25, it will turn such mangle-wheel 9 in one direction until the pinion 34, passing into gear with the tooth at the one end of the series brings the shaft 32 into the hollow 54 at the one end of the guide 53 and is thereby compelled to work around the tooth in the manner illustrated by Fig. 26, to the inner side of the series of teeth 52 and then the pinion 34 working along the inner side of the series of teeth 52, as shown in Fig. 27, will turn the mangle-wheel 9 in the opposite direction until it arrives at the tooth at the other end of the series and bringing the shaft 32 into the hollow 55 at the other end of the guide 53, is guided around such tooth to the outer side of the series of teeth 52. The mangle-wheel 9 is thus made to turn alternately in opposite directions and to move the rack 6 forward and backward and thereby if the projection 10 be against the shoulder of the rack 6 to move the rack 5 backward and to allow it to be moved forward so that the guide-rods $s$ being made to receive motion from the rack 5 through the pinion 4, shafts $y$ $z$ and poker-bars or lifter-pillars $v$ will be raised and lowered through a distance corresponding to the movement forward and backward of the rack 6.

In the backward movement of the rack 6 the slotted link 24 is moved by the stud 25 so as to turn the lever 23 in the direction opposite to that in which its weight tends to turn it and as the rack 6 moves forward the stud 25 is withdrawn and first pulls and then after a certain position is attained allows the lever 23 to be turned by its weight. The ratchet-wheel 21 is thus gradually turned by the pawl 23$^a$ and thereby made to turn the cam 20 so as gradually to present to the nose 19$^a$ a part of larger and larger radius until the apex of the cam 20 is presented to or moved past the nose 19$^a$ and then to present to the nose 19$^a$ either the part of least radius or other part more or less adjacent thereto and so on. When the cam 20 is made to present the part of least radius to the nose 19$^a$ of the block 19 the projection 10 of the rack 5 is against the shoulder of the rack 6 throughout the forward and backward movement so that the movement upward and downward of the guide-rods $s$ corresponds to the movement of the rack 6. As gradually the cam 20 is made to present to the nose 19$^a$ a part of larger and larger radius the chain 15 is tightened so as to begin to turn the barrel 14 earlier and earlier in the backward movement of the rack 6 and thus to cause the pinion 12 to move the rack 5 backward relatively to the rack 6 to a greater and greater extent in the successive backward movements thereof thereby causing a greater and greater movement of the rack 5 and thereby a greater and greater movement of the guide-rods $s$ until the movement begins again as a movement of smaller extent. It is ordinarily convenient that the cam 20 should be turned at such a rate that the change from minimum to maximum movement of the guide-rods $s$ should take place in about seven or eight ascents of the guide-rods $s$. Obviously the upward movement of the guide-rods $s$ in the ordinary course of the winding of yarn in the machine takes place always from one position and then gradually extends in successive upward movements nearer to the top of the bobbin or the like until the maximum movement in each increase is attained and consequently the yarns or threads are wound into a body tapering upward more or less in the form of a tapering bottle which enables, as is well known, the yarns or threads to be pulled off easily at the end without requiring the bobbin 47 or the like or the mass of yarn thereon itself to turn, this being of especial advantage for the unwinding without danger of breakage of fine or weak yarns or threads. Obviously adjustment of the position of the stud 25 of the pawl 23ª or of the stop-screw 35 or change of the ratchet-wheel 21 or two or more of these expedients will enable the rate of change in the movement of the guide-rods s easily to be adjusted and by the various toothed wheels and pinions employed being changed for others of different relative proportions any requisite or desirable relations between the rates of movement of the several parts of the machine may be obtained.

If the cam 20 be made to present its part of least radius to the nose 19ª and the pawl 23ª be then turned out of position to act upon the ratchet-wheel 21, the racks 5, 6 will continue to move alike and the guide-rods s will move up and down always between the same limits for an indefinite period so that the machine may be used for winding yarns or threads on bobbins or the like with flanges at both ends.

When the bobbins in use upon the spindles have been filled with yarn or thread the guide-rods s are lowered by means of the disengagement of the pinion 4 from the collar 4ᵇ and the use of the handle y' so that a few turns of yarn or thread are wound upon the braids of the spindles b and the filled bobbins 47 being removed from the spindles b, fresh bobbins 47 are placed thereon and the guide-rods s are raised again by means of the handle y' and the pinion 4 is then allowed to pass again into engagement with the collar 4ᵇ and the yarns or threads being already attached to the braids of the spindles b begin to be wound upon the bobbins 47.

Bobbins with the lower surfaces of the flanges at the lower ends in the same plane as the braids of the spindles b to which they are applied or in planes nearer to the tips of the spindles may be used but there is in the use of such bobbins some risk that yarns or threads in being guided downward with the object of being wound upon the spindle-braids or being guided upward after being wound upon the spindle-braids in order to be wound on to newly applied bobbins may pass into the gaps between the flanges of the bobbins and the spindle-braids and thus be wound on to the blades of the spindles with the result that it may be difficult to guide them in the way desired and that eventually there may be obstruction by the yarn or thread wound upon the spindle-blades to the application of bobbins upon the spindle-blades. In order to obviate this inconvenience, it is preferable to use bobbins provided with lower flanges formed with recesses adapted to cover the braids of the spindles or like parts wholly or partially to such an extent as to prevent yarns or threads from passing between the flanges and the braids or like parts. Flanges formed in this way are shown in Figs. 15, 16, 17, 21, 22 and 23 which show recesses 49 formed in the flanges 50 so that the flanges 50 extend some little way down the braids so as to guide yarn or thread safely on to the collars below the braids of the spindles b.

In order to insure that in the commencement of winding upon bobbins yarns or threads led on to bobbins after being led to the spindles so as to be wound upon the braids or collars thereof shall commence at once to be wound upon the bobbins when the spindles are set in motion after a stoppage for the placing of fresh bobbins upon the spindles and especially when as usual they move slowly in being set in motion after such a stoppage notches or indentations 51 are formed in the flanges 50 or like parts of bobbins so that the yarns or threads may be caught and engaged therein and so at once begin to be wound upon the bobbins. There may be one notch or indentation or a greater number of notches or indentations, Figs. 18, 19, 20 showing a flange with one and Figs 15, 16, 17 showing a flange with four. Figs. 15, 16, 17 show notches or indentations formed in flanges formed with recesses 49 and Figs. 18, 19, 20 illustrate the formation of notches or indentations formed in flanges without such recesses 49. Figs. 15, 16, 17, 18, 19, 20, 21, 22 and 23 show bobbins with wide flanges at one end such as are used in winding yarns or threads into forms tapering at one end.

What we do claim as our invention and desire to secure by Letters Patent is:—

1. In a yarn-winding machine, movable yarn-guides, means for carrying the yarn-guides and moving them, comprising a pinion, a rack in engagement with such pinion, a longitudinally movable bar with means to engage such rack, means to move such bar to and fro longitudinally, a pinion carried by such bar and in engagement with the said rack and a barrel fast with such pinion, a flexible connection attached to and adapted to be wound on and off such barrel, a lever connected to such flexible connection and mounted on a fixed pivot and provided with a part to bear against a cam, a cam having a bearing surface of different radius in different parts and means in connection with the said bar for turning the said cam gradually whereby the yarn-guides are made to perform a succession of series of movements commencing at one position but of different amplitudes, substantially as hereinbefore described.

2. In a yarn-winding machine, movable yarn-guides, means for carrying the yarn-guides and moving them, comprising a pinion, a rack in engagement with such pinion, a longitudinally movable bar with means to engage such rack, means to move such bar to and fro longitudinally, a pinion carried by such bar and in engagement with the said rack and a barrel fast with such pinion, a flexible connection attached to and adapted to be wound on and off such barrel, a lever mounted on a fixed pivot and connected to such flexible connection and provided with a part to bear against a cam, a cam having a bearing surface of a radius gradually increasing to a maximum and means in connection with the said bar for turning the said cam gradually whereby the yarn-guides are made to perform a succession of series of movements commencing at one position beginning at one extent and gradually increasing, substantially as hereinbefore described.

3. In a yarn-winding machine, movable yarn-guides, means for carrying the yarn-guides and moving them, comprising a pinion, a rack in engagement with such pinion, a longitudinally movable bar with means to engage such rack, means to move such bar to and fro longitudinally, a pinion carried by such bar and in engagement with the said rack and a barrel fast with such pinion, a flexible connection attached to and adapted to be wound on and off such barrel, a lever mounted on a fixed pivot and connected to such flexible connection and provided with a part to bear against a cam, a cam having a bearing surface of different radius in different parts, a ratchet-wheel connected to such cam and means in connection with the said bar for turning the said ratchet-wheel and so the cam gradually, whereby the yarn-guides are made to perform a succession of series of movements commencing at one position but of different amplitudes, substantially as hereinbefore described.

4. In a yarn-winding machine, movable yarn-guides, means for carrying the yarn-guides and moving them, comprising a pinion, a rack in engagement with such pinion, a longitudinally movable bar with means to engage such rack, means to move such bar to and fro longitudinally, a pinion carried by such bar and in engagement with the said rack and a barrel fast with such pinion, a flexible connection attached to and adapted to be wound on and off such barrel, a lever mounted on a fixed pivot and connected to such flexible connection and provided with a part to bear against a cam, a cam having a bearing surface of divergent radius in different parts, a ratchet-wheel connected to such cam and means comprising a pawl capable of being put out of action in connection with the said bar for turning the said ratchet-wheel and so the cam gradually, whereby the yarn-guides are made to perform a succession of series of movements commencing at one position but of different amplitudes, substantially as hereinbefore described.

5. In a yarn-winding machine, movable yarn-guides, means for carrying the yarn-guides and moving them, comprising a pinion, a rack in engagement with such pinion, a longitudinally movable bar with means to move such rack, means to move such bar to and fro longitudinally, a pinion carried by such bar and in engagement with the said rack and a barrel fast with such pinion, a flexible connection attached to and adapted to be wound on and off such barrel, a lever mounted on a fixed pivot and connected to such flexible connection and provided with a part to bear against a cam, a cam having a bearing surface of a radius gradually increasing to a maximum, a ratchet-wheel connected to such cam and means in connection with the said bar for turning the said ratchet-wheel and so the cam gradually, whereby the yarn-guides are made to perform a succession of series of movements commencing at one position but of different amplitude, substantially as hereinbefore described.

6. In a yarn-winding machine, movable yarn-guides, means for carrying the yarn-guides and moving them, comprising a pinion, a rack in engagement with such pinion, a longitudinally movable bar with means to move such rack, means to move such bar to and fro longitudinally, a pinion carried by such bar and in engagement with the said rack and a barrel fast with such pinion, a flexible connection attached to and adapted to be wound on and off such barrel, a lever mounted on a fixed pivot and connected to such flexible connection and provided with a part to bear against a cam, a cam having a bearing surface of a radius gradually increasing to a maximum, a ratchet-wheel connected to such cam and means comprising a pawl capable of being put out of action in connection with the said bar for turning the said ratchet-wheel and so the cam gradually, whereby the yarn-guides are made to perform a succession of series of movements commencing at one position but of different amplitude, substantially as hereinbefore described.

7. In a yarn-winding machine, movable yarn-guides, means for carrying the yarn-guides and moving them, comprising a pinion, a rack in engagement with such pinion, a longitudinally movable bar with means to engage such rack and itself provided with a rack, a pinion in engagement with the rack of the bar, a mangle-wheel in connection with such pinion and means to turn such mangle-wheel backward and forward and thereby to move the said bar to and fro longitudinally, a pinion carried by such bar and in engagement with the rack first named and a barrel fast with such pinion, a flexible connection attached to and adapted to be wound on and off such barrel, a lever mounted on a fixed pivot and connected to such flexible connection and provided with a part to bear against a cam, a cam having a bearing surface of different radius in different parts and means in connection with the said bar for turning the said cam gradually whereby the yarn-guides are made to perform a succession of series of movements commencing at one position but of different amplitudes, substantially as hereinbefore described.

8. In a yarn-winding machine, movable yarn-guides, means for carrying the yarn-guides and moving them comprising a pinion, a rack in engagement with such pinion, a longitudinally movable bar with means to engage such rack and itself provided with a rack, a pinion in engagement with the rack of the bar, a mangle-wheel in connection with such pinion and means to turn such mangle-wheel backward and forward and thereby to move the said bar to and fro longitudinally, a pinion carried by such bar and in engagement with the rack first named and a barrel fast with such pinion, a flexible connection attached to and adapted to be wound on and off such barrel, a lever mounted on a fixed pivot and connected to such flexible connection and provided with a part to bear against a cam, a cam having a bearing surface of a radius increasing to a maximum and means in connection with the said bar for turning the said cam gradually whereby the yarn-guides are made to perform a succession or series of movements commencing at one position, beginning at one extent and gradually increasing, substantially as hereinbefore described.

9. In a yarn-winding machine, movable yarn-guides, means for carrying the yarn-guides and moving them comprising a pinion, a rack in engagement with such pinion, a longitudinally movable bar with means to engage such rack and itself provided with a rack, a pinion in engagement with the rack of the bar, a mangle-wheel in connection with such pinion and means to turn such mangle-wheel backward and forward and thereby to move the said bar to and fro longitudinally, a pinion carried by such bar and in engagement with the said rack and a barrel fast with such pinion, a flexible connection attached to and adapted to be wound on and off such barrel, a lever mounted on a fixed pivot and connected to such flexible connection and provided with a part to bear against a cam, a cam having a bearing surface of different radius in different parts, a ratchet-wheel connected to such cam and means in connection with the said bar for turning the said ratchet-wheel and so the cam gradually whereby the yarn-guides are made to perform a succession of series of movements commencing at one position but of different amplitudes, substantially as hereinbefore described.

10. In a yarn-winding machine, movable yarn-guides, means for carrying the yarn-guides and moving them comprising a pinion, a rack in engagement with such pinion, a longitudinally movable bar with means to engage such rack and itself provided with a rack, a pinion in engagement with the rack of the bar, a mangle-wheel in connection with such pinion and means to turn such mangle-wheel backward and forward and thereby to move the said bar to and fro longitudinally, a pinion carried by such bar and in engagement with the said rack and a barrel fast with such pinion, a flexible connection attached to and adapted to be wound on and off such barrel, a lever mounted on a fixed pivot and connected to such flexible connection and provided with a part to bear against a cam, a cam having a bearing surface of different radius in different parts a ratchet-wheel connected to such cam and means comprising a pawl capable of being put out of action in connection with the said bar for turning the said ratchet-wheel and so the cam gradually whereby the yarn-guides are made to perform a succession of series of movements commencing at one position but of different amplitudes, substantially as hereinbefore described.

11. In a yarn-winding machine, movable yarn-guides, means for carrying the yarn-guides and moving them comprising a pinion, a rack in engagement with such pinion, a longitudinally movable bar with means to engage such rack and itself provided with a rack, a pinion in engagement with the rack of the bar, a mangle-wheel in connection with such pinion and means to turn such mangle-wheel backward and forward and thereby to move the said bar to and fro longitudinally, a pinion carried by such bar and in engagemennt with the said rack and a barrel fast with such pinion, a flexible connection attached to and adapted to be wound on and off such barrel, a lever mounted on a fixed pivot and connected to such flexible connection and provided with a part to bear against a cam, a cam having a bearing surface of a radius gradually increasing to a maximum, a ratchet-wheel connected to such cam and means in connection with the said bar for turning the said ratchet-wheel and so the cam gradually whereby the yarn-guides are made to perform a succession of series of movements commencing at one position beginning at one extent and gradually increasing, substantially as hereinbefore described.

12. In a yarn-winding machine, movable yarn-guides, means for carrying the yarn-guides and moving them comprising a pinion, a rack in engagement with such pinion, a longitudinally movable bar with means to engage such rack and itself provided with a rack, a pinion in engagement with the rack of the bar a mangle-wheel in connection with such pinion and means to turn such mangle-wheel backward and forward and thereby to move the said bar to and fro longitudinally, a pinion carried by such bar and in engagement with the said rack and a barrel fast with such pinion, a flexible connection attached to and adapted to be wound on and off such barrel, a lever mounted on a fixed pivot and connected to such flexible connection and provided with a part to bear against a cam, a cam having a bearing surface of a radius gradually increasing to a maximum, a ratchet-wheel connected to such cam and means comprising a pawl capable of being put out of action in connection with the said bar for turning the said ratchet-wheel and so the cam gradually, whereby the yarn-guides are made to perform a succession of series of movements commencing at one position beginning at one extent and gradually increasing, substantially as hereinbefore described.

In testimony, that we claim the foregoing as our invention, we have signed our names in presence of two witnesses, this fourth day of August 1911.

ALFRED SEELEY.
HERBERT HOLT.

Witnesses:
HOWARD CHEETHAM,
RUTH M. WILSON.

---

Copies of this patent may be obtained for five cents each, by addressing the "Commissioner of Patents, Washington, D. C."